July 5, 1932. J. O. LIFFLANDER 1,866,166
SIGNALING DEVICE FOR CLUTCHING OR THE LIKE
Filed Dec. 11, 1930
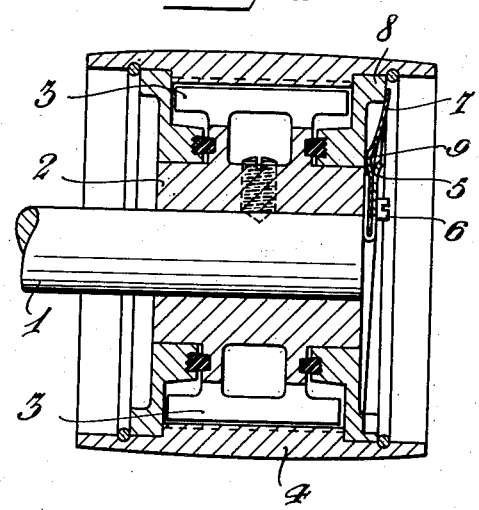
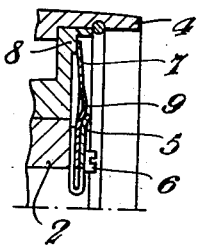
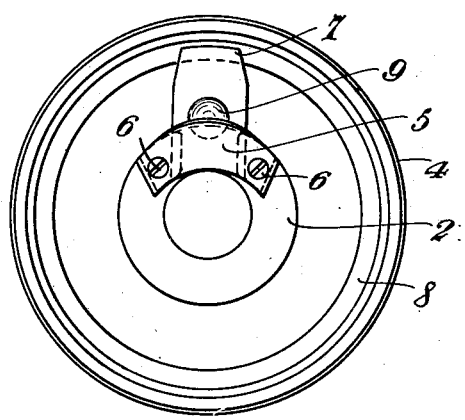
Inventor,
Johan O. Lifflander,
By Henry Orth Jr. Atty.

Patented July 5, 1932

1,866,166

UNITED STATES PATENT OFFICE

JOHAN OSCAR LIFFLANDER, OF STOCKHOLM, SWEDEN, ASSIGNOR TO PULVIS AKTIEN-GESELLSCHAFT, OF GLARUS, SWITZERLAND, A CORPORATION OF SWITZERLAND

SIGNALING DEVICE FOR CLUTCHING OR THE LIKE

Application filed December 11, 1930, Serial No. 501,678, and in Sweden December 9, 1929.

This invention relates to a simple and reliable signaling device to indicate when relative rotation takes place between machine parts which are adapted normally to rotate synchronously but which are capable of relative rotation under certain circumstances and in connection with which it is desirable to know when such relative rotation is taking place. This is true, for instance, in case of yielding clutches which comprise coaxially mounted relatively rotatable driving and driven elements between which power transmission is effected through the intermedium of a powdered, grainy or similar material which allows the driven element to slip relatively to the driving element due to a certain over-load on the driven element, in as much as a slipping action will take place between the particles of said power transmitting material. As the heat generation within the material which is due to said slipping action may give rise to hot running, resulting in touching of cooperating parts and damaging of the clutch or parts connected thereto, or subjecting the neighbourhood to danger of fire, it is of importance to ascertain without fail whenever slipping is taking place, as well as the amount of such slipping actis.n.

The signaling device according to this invention comprises a plate spring attached to either of the relatively rotatable elements which is deformed so that a deflection of the spring to the one side or the other at right angles to the plane of the spring will cause the deformed portion of the spring to bend to the opposite side relatively to said deflection, whereby a distinctly audible click will result, the other one of said relatively rotatable elements being provided with an uneven or cam surface against which the free end of the spring bears and which will alternately deflect the spring to the one side and the other due to relative rotation of said elements, thereby causing the spring to emit a click two times at least during each revolution of said relative rotation.

In the accompanying drawing one embodiment of the invention is illustrated. Fig. 1 is a longitudinal section of a yielding clutch provided with a signaling device according to the invention. Fig. 2 is an end view of the clutch to show the signaling device in elevation. Fig. 3 is a detail section corresponding to that shown in Fig. 1 of the signaling device with the spring in a different position from that shown in Fig. 1.

The clutch shown which is only chosen as an example comprises a hub 2 keyed to a shaft 1 which carries a pair of rigid wings or blades 3 and a drum 4 rotatably mounted on the hub 2 which is adapted to be partially filled with any powdered, grainy, or similar material capable of serving as a power transmitting medium between the wings 3 and the drum 4, when shaft 1 rotates and the wings, as a result, tend to cause the said material to also rotate. Attached to one end of the hub 2, as by a clip 5, and a pair of screws 6, is a plate spring 7 which projects substantially radially and bears with its free end upon an axial cam 8 provided on one end wall of the drum. The plate spring 7 is formed with a boss near the point where it is held by said clip, as shown at 9, said boss being produced, for instance, by deforming the finished spring. The position of said boss relatively to the clip 5 and the axial extension of the cam 8 are so chosen as to cause the spring 7 during one revolution of relative rotation of the elements 2 and 4 to deflect from the position shown in Fig. 1, in which the boss is directed inwards, to the position shown in Fig. 3, in which the boss is directed outwards, and back again. Each time the boss 9 shifts from one position to the other a distinctly audible click will be produced.

The fact that a plate spring deformed in the way above set forth or in a similar way will emit a click when deflected to one side or the other is well-known per se, and I do not claim said fact as new. On the contrary, I claim the provision of such a spring in connection with a cam surface to positively control the spring in order to provide an automatic signaling device for the purpose above set forth and similar purposes.

Special advantages of this signaling device include the exceedingly simple construction of the device as well as the fact that the device acts equally safely, however slowly the elements may rotate with respect to each other, that is to say, however slight the slipping action may be. Of course, modifications as to shape and arrangement may be made without departing from the principle of the invention. For instance, the cam surface 8 may comprise more than one cam in which case more than two clicks will be heard for each revolution of the elements relatively to each other.

What I claim is:—

1. The combination with a clutch, comprising a driving and a driven part and means to transmit power between said parts in such a way as to allow the driven part to slip relatively to the driving part due to an overload, of a cam on one of said parts, a plate spring having a deformed portion, a clip to attach said spring to the other part in position for the free end of the spring to engage said cam, and allow it to deflect axially under the action of the cam due to a rotation of the clutch parts so as to cause the spring to emit audible clicks due to said deflections when relative rotation of the clutch parts is taking place.

2. The combination with a clutch comprising a driving and a driven part and means to transmit power between said parts in such a way as to allow the driven part to slip relatively to the driving part due to an overload, one of said parts having an uneven surface, of a plate spring having a deformed portion and means for attaching said spring to the other part in position for the free end of the spring to engage said surface and allow it to deflect axially under the action of the surface due to a rotation of the clutch parts so as to cause the spring to emit audible clicks due to said deflections when relative rotation of the clutch parts is taking place.

JOHAN OSCAR LIFFLANDER.